May 22, 1956 H. DREYER ET AL 2,747,161
ARRANGEMENT FOR MEASURING THE R.M.S. VALUES OF
ALTERNATING CURRENTS AND VOLTAGES
Filed April 10, 1953 2 Sheets-Sheet 1

INVENTORS:
Helmut DREYER and
Leo BOLLER

Attorney

INVENTORS:
Helmut DREYER and
Leo BOLLER

United States Patent Office 2,747,161
Patented May 22, 1956

2,747,161

ARRANGEMENT FOR MEASURING THE R. M. S. VALUES OF ALTERNATING CURRENTS AND VOLTAGES

Helmut Dreyer and Leo Boller, Erlangen, Germany, assignors to P. Gossen & Co. G. m. b. H., Erlangen, Bavaria, Germany Application April 10, 1953, Serial No. 347,964

Claims priority, application Germany April 17, 1952

4 Claims. (Cl. 324—132)

This invention relates to an arrangement for measuring the R. M. S. values of alternating currents and voltages.

It is an object of the present invention to provide means by which such R. M. S. values can be measured with great accuracy, low internal loss and independently of the influence of the form factor, over a wide range of different frequencies.

Another object of the invention is to increase the constancy of the measurement.

Still another object of the invention is to obtain a reliable indication within a selected part of the total measuring range while suppressing the rest of the indication between zero and the lower end of said selected part.

A still further object of the invention is to eliminate entirely or substantially a number of sources of faults existing in the conventional measuring devices, such as influences of temperature, outer fields and aging effects on the permanent magnet and influences of temperature and aging effects upon the spring of the measuring device.

Still another object of the invention is to provide a measuring instrument which can be used for both direct and alternating current measurements, without switching over.

With these and further objects in view, according to the present invention a quotient measuring instrument with permanent field magnet is used, one moving coil of which is traversed by the current to be measured in series with a constant resistance while the second moving coil is traversed by the current to be measured in series with a variable resistance whose resistance value is a function of, and more particularly proportional to, the square mean value of the current traversing it, and said measuring instrument is arranged to measure electrical currents or voltages from a lowest value which is not less than one third of the highest value which can be measured. In other words, the scale and pointer arrangement permits indication upwards from an initial value which is not less than one third of the end value of the scale.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 1:
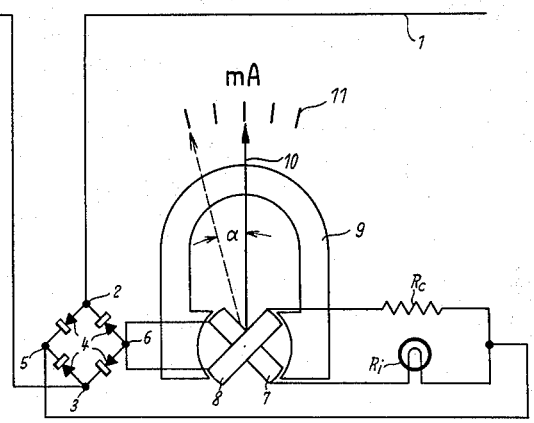
Figure 2:
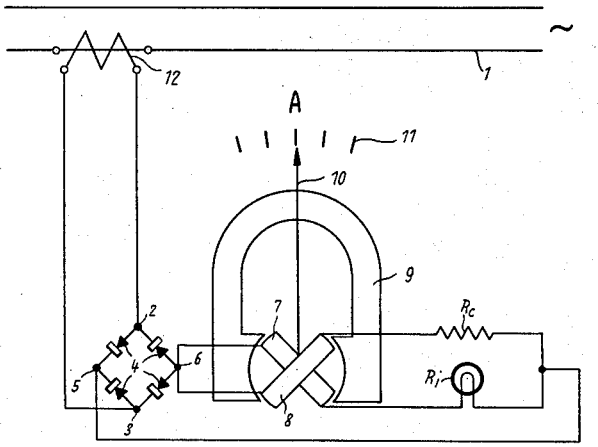
Figure 5:
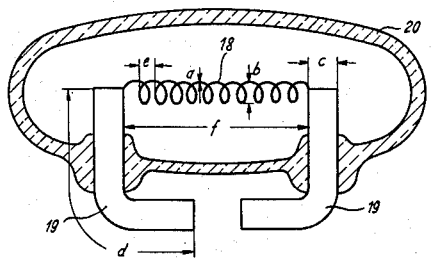
Figure 3:
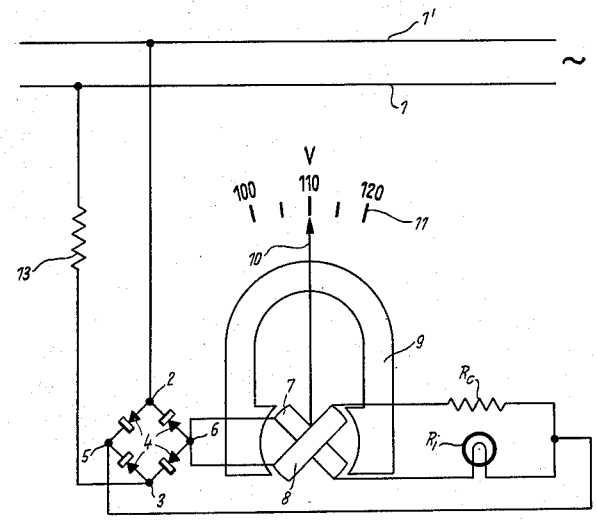
Figure 4:
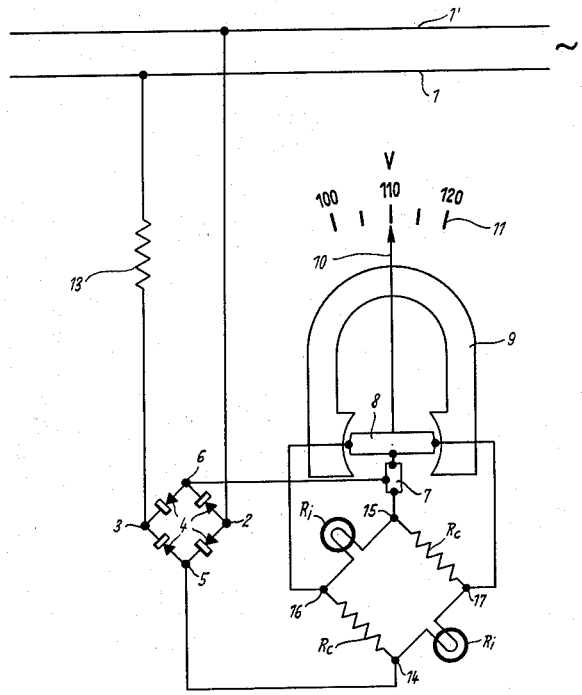

Fig. 1 is a diagram of connection showing one embodiment of a measuring arrangement for measuring electric currents in accordance with the invention, Fig. 2 is a similar diagram, but showing an arrangement with current transformer, Fig. 3 is a similar diagram, but showing an arrangement for measuring voltages, Fig. 4 is a modified form of diagram for voltage measurements, and Fig. 5 is an axial section through a variable resistance which can be used in connection with the measuring system according to the present invention.

Similar reference numerals denote similar parts in the different figures.

Referring to the drawings in greater detail and first to Fig. 1, it will be seen that an alternating current conductor 1 is connected to the primary terminals 2, 3 of a full-wave rectifier circuit comprising four rectifiers 4 connected in conventional manner. The secondary terminals 5, 6 of the rectifier circuit are connected to the two ends of each of two coils 7 and 8 of a quotient measuring device, coil 7 being connected thereto through an ohmic resistance $R_c$ while coil 8 is connected thereto through a variable resistance $R_1$, e. g., an incandescent lamp, whose resistance value depends upon the square mean value of the current traversing it. The coils 7 and 8 are rotatably mounted in the magnetic field of a permanent magnet 9 and their deflection—or rather their actual position since there is no zero position in accordance with the quotient measuring principle—is indicated by a pointer 10 on a scale 11 of the type known as scale with suppressed or omitted zero.

The coils 7 and 8 under action of the direct currents traversing them and the magnetic field of magnet 9 generate two oppositely directed torques. The angle of deflection $\alpha$ of the measuring device in this case is obtained from the formula:

$$\alpha = f\left(\frac{Md_1}{Md_2}\right) = K \cdot f\left(\frac{AW_1 \cdot F}{AW_2 \cdot F}\right)$$

in which $Md_1$ and $Md_2$ are the torques of the two coils, $AW_1$ and $AW_2$ are the ampere turns corresponding thereto and F is the form factor. It follows that a measurement with rectified alternating current is independent of the form factor if the latter is equal for both coils, since the form factor occurs in the numerator and in the denominator.

Since the resistance value of the variable resistor $R_1$ depends upon the current intensity while the resistance value of the constant resistor $R_c$ is independent thereof, the measuring device will indicate the change of $R_1$, i. e. the variation of the current intensity, independently of the form factor. If the change of resistance $R_1$ is proportional to the square mean value of the current, for instance, as a result of Joules' heat produced therein, the permanent magnetic measuring device will indicate the virtual value of the current.

It will be understood that the above mentioned objects aimed at by the present invention can thus be secured. The internal loss can be kept at a low figure, since the permanent magnetic measuring device has a high sensitivity. The scope of the scale of the measuring device can be restricted to the range which is of interest, for instance, in case of voltage supervisions in 110 volt systems, to 100 to 120 volts, whereby the accuracy of reading can be substantially increased. Adjustment of the zero point is not necessary since there is no spring or other mechanical countertorque. Faults due to temperature, outer fields and aging of the permanent magnet are eliminated owing to the use of a quotient measuring device. Thus the increased accuracy of reading is accompanied by an increased accuracy of measurement. Since it is not necessary to use in the alternating current circuit of the instrument any elements depending on the frequency, the indication is independent of the frequency within wide limits. Where suitable rectifiers are used, the measuring device can be used for direct and alternating current without switching over. Owing to the low internal loss it is also possible to use the measuring device for voltage measurements with built-in series resistances. Separate series resistances or the like as normally required to avoid undue heating of the instrument can be dispensed with.

It will be understood that the rectifiers 4 and especially the variable resistors $R_i$ varying with current should be adapted as to their dimensions and connection to the possibilities of the measuring device 7, 8.

If the variation of the resistance value of the variable resistor $R_i$ required to form the square mean value is caused by heating, this resistor has to meet certain requirements to avoid faulty measurements. Thus it must not undergo any structural change even after many years of operation, i. e. the resistance value must always be the same with the same current intensity. Preferably the lowest operating temperature of the resistor $R_i$ should be several hundred degrees centigrade above the ambient temperature in order to reduce the influence of varying ambient temperatures to a negligible amount. Hence, its maximum operating temperature will become relatively high. Again, it is required that no changes of the geometric shape of the resistance wire nor of its cross section nor of its internal structure are caused by such high temperatures. Also regions with points of internal structural transformation should be avoided, so as to eliminate hysteresis effects. The temperature coefficient of the material should be as high as possible in order that the increase of resistance due to increase of temperature and vice versa becomes as large as possible. The construction of the resistor should be such that a relatively high heating effect is produced with a minimum of energy, i. e., the transmission of heat by conduction and radiation should be as small as possible. Also the mass of the resistor and of the parts in thermal contact therewith should be as low as possible, in order to avoid time lags. Where a thermal contact with larger masses cannot be avoided, as for instance, in the current supply conductors, it is advantageous to construct these masses in such a way that the heat produced by the resistance is carried off to the surroundings as quickly as possible. If these masses are themselves sensibly heated by the heat of the resistance material, the temperature potential and so the total heating of the variable resistance $R_i$ will depend on this heating effect. Hence, stable conditions can be expected only after a certain time of equalization which will cause a delayed indication of the correct value with any change of the quantity to be measured. Therefore, such heating up of the masses in thermal contact with the resistance wire should be avoided. Furthermore, the current supply means must be constructed in such a way that they do not produce any disturbing thermal tensions. Hence, they will be constructed in such a way that their outer ends are kept on the ambient temperature and that their inner ends differ from this ambient temperature as little as possible and that their temperature above ambient, if any, is kept at a constant rate. The lower the temperature rise of the inner ends, the smaller will be the disturbances due to the Peltier effect. It follows that the cross section of the current supply conductors should be as large as possible, their length should be as small as possible and the transmission of heat to the surroundings should be facilitated as much as possible.

A variable resistor $R_i$ meeting these conditions is shown by way of example in Fig. 5. A coil of tungsten wire 18 is freely suspended between a pair of current supply conductors 19 fused in an evacuated glass bulb 20. The thickness "$a$" of the wire 18 is below 20 microns and the outer diameter "$b$" of the coil is less than 0.3 mm. The coil is wound in such a way that the distance or spacing "$e$" between adjacent turns is smaller than the diameter "$a$" of the tungsten wire, in order to keep the radiated amount of energy as low as possible. The diameter "$c$" of the current supply conductors 19 should be so large that their cross section is at least the hundredfold cross section of the tungsten wire 18, and their length within the glass bulb should be as small as possible. Their outer ends should be disposed as close together as possible in order that disturbing thermal tensions are avoided and they should be constructed or connected in such a way that the heat transferred to them from the tungsten wire is transmitted to the surroundings as quickly as possible. The total length "$f$" of the coil should be more than 4 mms., if possible, in order that their uniformly heated middle part becomes sufficiently long. On the other hand, the length "$d$" of members 19 should be as small as possible.

With a resistor of this type it is possible to attain an increase of temperature of some hundred degrees centigrade with currents of the order of 5 ma., whereby a variation of the resistance can be attained which is sufficient to obtain a considerable deflection of the pointer with relatively small variations of current. With these operating conditions the rate of evaporation or atomizing of the tungsten wire is still extremely small. Since further detrimental influences, e. g., by atmospheric substances, cannot act upon the wire 18 owing to the fact that it is fused in vacuum, it is possible to produce with such variable resistors measuring arrangements whose accuracy of measurement is matched to the increased accuracy of reading obtainable with the above mentioned limited scope of scale. The total internal loss is considerably reduced also for voltmeters compared to that of moving iron instruments, while the frequency range is very largely increased. Hence it is also easily possible to carry off the entire amount of heat produced, through the casing of the instrument, so that additional external series resistances or the like are not required.

While Fig. 1 shows a connection for directly indicating milliammeters, the connection for current intensities which do not correspond to the normal measuring range of the instrument is shown in Fig. 2. It will be seen that a current transformer 12 rather than a shunt resistance has been used for adaptation to the measuring range of the instrument. On principle, shunt resistances could also be used in view of the purely ohmic resistance of the measuring circuit, but owing to the rectifiers they are not advantageous. In case of a change of the passage resistance of the rectifiers, faults would occur by the use of shunt resistances while such faults are avoided in case of current transformers. For the rest, the arrangement is the same as that shown in Fig. 1.

Fig. 3 shows a measuring arrangement for voltage measurement. A measuring range from 100 to 120 volts has been provided on the scale 11. In this case, terminal 2 is connected to conductor 1' and terminal 3 is connected to conductor 1 through a series resistance 13 which is properly dimensioned. Owing to the high resistance value of the resistor 13, changes of the passage resistance of the rectifier will have only very little influence upon the accuracy of measurement. An interposed voltage transformer which would increase the ratio of the rectifier resistance to the ohmic resistance, would cause an increase of the possibilities of faults by aging. Consequently, the low current intensity required for the variable resistance $R_i$ is of great importance, since it determines the internal loss of the entire measuring arrangement.

A circuit arrangement for voltage measurement with resistances varying with the current inserted in a bridge circuit is shown in Fig. 4. In this case, the secondary terminal 5 of the rectifier circuit 4 is connected to the terminal 14 of a bridge circuit comprising two constant resistances $R_c$ and two variable resistors $R_i$ whose resistance value varies with the square mean value of the current traversing them. The other secondary terminal 6 of the rectifier circuit 4 is connected, through one of the moving coils 7, to the second terminal 15 of the said bridge circuit $R_c$, $R_i$, while the second moving coil 8 is connected across the terminals 16, 17, of said bridge circuit, or in other words, in the bridge wire thereof. It will be seen that the measuring or deflecting coil 8 of the measuring frame is arranged in a horizontal direction, while the directional coil 7 thereof is vertically arranged and replaces the spring of the moving coil galvanometer hitherto used for such measuring arrangements. However, while a moving coil galvanometer would permit a correct measurement of the R. M. S. value only in its zero position, while being liable to a fault due to the form factor in case of deviations from its zero position, the arrangement shown in Fig. 4 is absolutely free from faults due to the form factor and permits the correct and accurate measurement of the R. M. S. values over the entire scope of the scale.

The circuit arrangement of Fig. 4 may comprise, for instance, a resistor 13 of 22 kΩ, two resistors of constant resistance value $R_c$ of 220 Ω and two variable resistors $R_1$ whose resistance value varies with the square mean value of the current between 200 and 240 ohms. By way of alternative, one of the resistors $R_1$ may be replaced by a constant resistance $R_c$ and two variable resistors $R_1$ may be arranged in series in the other bridge arms instead of the other single resistor $R_1$, whereby different effects can be obtained as to the measuring range.

It will be understood that while our novel arrangement measures currents, the R. M. S. values of voltages can also be measured by suitable connections in per se known manner, for instance, as hereinbefore described with reference to Fig. 3.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. An arrangement for measuring the R. M. S. value of alternating currents, comprising a rectifier having two output terminals of opposite polarity and input terminals adapted to be connected in the alternating current circuit whose current is to be measured, a crossed-coil measuring instrument including a permanent field magnet, two moving coils, substantially constant resistance means, variable resistance means whose resistance value is a substantially invariable function of the R. M. S. value of the current traversing it, and connections between said output terminals, the two ends of each of said moving coils, the constant resistance means and the variable resistance means, said connections being arranged in such a way that a first complete circuit is formed through the first moving coil, the constant resistance means, and the two output terminals of the rectifier, while a second complete circuit is formed through the second moving coil, the variable resistance means, and the two output terminals of the rectifier, said measuring instrument being arranged to measure electrical quantities from a lowest value which is not less than one third of the highest value which can be measured.

2. An arrangement for measuring the R. M. S. value of alternating currents, comprising a rectifier having two output terminals of opposite polarity and input terminals adapted to be connected in the alternating current circuit whose current is to be measured, a cross-coil measuring instrument including a permanent field magnet, two moving coils, substantially constant resistance means, variable resistance means whose resistance value is substantially proportional, in a substantially invariable relation, to the R. M. S. value of the current traversing it, and connections between said output terminals, the two ends of each of said moving coils, the constant resistance means and the variable resistance means, said connections being arranged in such a way that a first complete circuit is formed through the first moving coil, the constant resistance means, and the two output terminals of the rectifier, while a second complete circuit is formed through the second moving coil, the variable resistance means, and the two output terminals of the rectifier, said measuring instrument being arranged to measure electrical quantities from a lowest value which is not less than one third of the highest value which can be measured.

3. An arrangement for measuring the R. M. S. value of alternating currents, comprising a rectifier having two output terminals of opposite polarity and input terminals adapted to be connected in the alternating current circuit whose current is to be measured, a crossed-coil measuring instrument including a permanent field magnet, two moving coils, substantially constant resistance means, variable resistance means whose resistance value is a substantially invariable function of the R. M. S. value of the current traversing it, and connections between said output terminals, the two ends of each of said moving coils, the constant resistance means and the variable resistance means, said connections being arranged in such a way that a complete circuit through the two output terminals, the resistance means, and the moving coils is established and that the current traversing one of said moving coils is proportional to the resistance value of the constant resistance means while the current traversing the other moving coil is proportional to the resistance value of the variable resistance means, and a measuring scale and pointer arrangement for indication from an initial value which is not less than one third of the end value of the scale.

4. An arrangement for measuring the R. M. S. value of alternating currents, comprising a rectifier having two output terminals of opposite polarity and input terminals adapted to be connected in the alternating current circuit whose current is to be measured, a measuring instrument including a permanent field magnet and a moving coil unit comprising a measuring coil and a directional coil crosswisely arranged at right angles to the measuring coil, a bridge circuit comprising four poles and including constant resistance means and variable resistance means whose resistance value is a substantially invariable function of the R. M. S. value of the current traversing it, the measuring coil being connected across two opposite poles of the bridge circuit and one of the output terminals of the rectifier being connected to one of the remaining poles of the bridge circuit while the second output terminal of the rectifier is connected to a point substantially halfway between the ends of the directional coil whose ends are connected to the second one of the remaining poles of the bridge circuit and to a point substantially halfway between the ends of the measuring coil, respectively, said measuring instrument being arranged to measure electrical quantities from a lowest value which is not less than one third of the highest value which can be measured.

References Cited in the file of this patent

FOREIGN PATENTS

| | | |
|---|---|---|
| 508,998 | Great Britain | July 10, 1939 |
| 224,138 | Switzerland | Oct. 31, 1942 |
| 894,876 | France | Mar. 20, 1944 |